Patented May 20, 1930

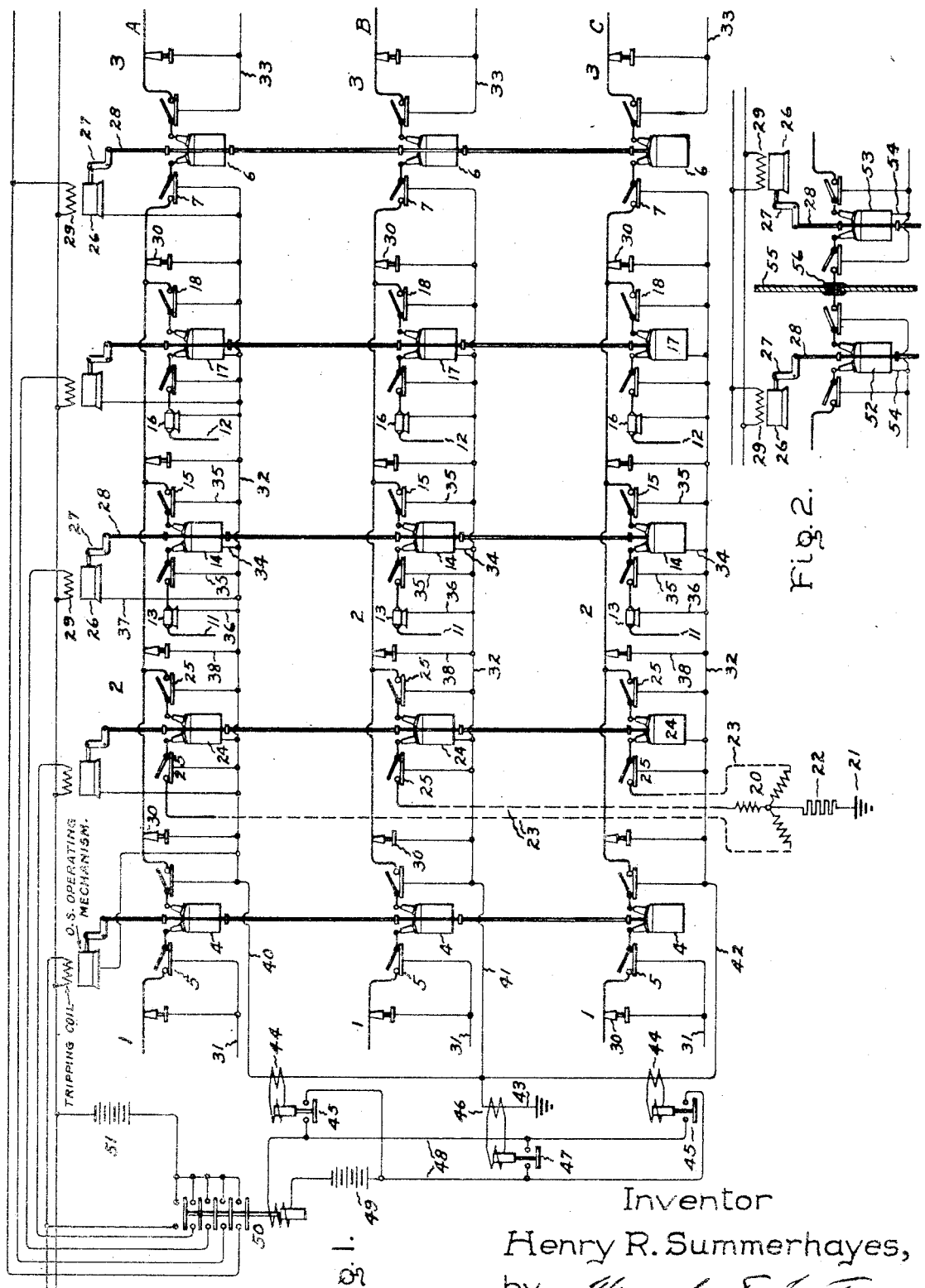

1,759,765

UNITED STATES PATENT OFFICE

HENRY R. SUMMERHAYES, OF SCHENECTADY, NEW YORK, ASSIGNOR TO GENERAL ELECTRIC COMPANY, A CORPORATION OF NEW YORK

PROTECTIVE SYSTEM

Application filed February 13, 1926. Serial No. 88,160.

My invention relates to a protective system which is particularly applicable to a high potential switching system of the type in which the switches, bus bars, etc. are arranged in one or more sections whereby in the event of trouble in one section that section may be completely isolated from the rest of the system. An object of my invention is the provision of improved means for automatically effecting the isolation of a section in such a switching system should there occur a fault to ground in that section.

Various means have been proposed for use in high potential polyphase switching systems for reducing or eliminating the possibility of interphase short circuits. For example, the phases and apparatus associated with each have been isolated from each other in the case of outdoor switching stations by a wide separation thereof and in the case of indoor stations by the walls or the floors of the building in which the apparatus is housed. In other examples the phase conductors have been isolated from each other by being separately enclosed, the conductors being insulated from the enclosing structures by liquid or solid insulating material. While the possibility of interphase short circuits in such systems is almost entirely removed, there still remains the danger, particularly when the system is supplied by a Y-connected source having a grounded neutral, of a fault from any phase to ground inasmuch as the various switches, switch operating mechanisms, bus insulator supports, current transformers, etc. usually are grounded.

In accordance with my invention, which may be applied to systems such as mentioned above or to other systems having one or more sections, I provide a separate ground bus for each section of the switching system and for each phase in the case of a polyphase system by which ground bus the grounding of the switches, the switch operating mechanisms, the bus insulator supports, the current transformers, etc. of that section is affected. By suitable current responsive devices in the separate ground buses I cause the tripping out of all switches, bus section switches, generator switches, feeder switches, etc. which control current flow to the section which is effected. That section thereby is completely cut off from the rest of the system.

My invention will be better understood from the following description taken in connection with the accompanying drawing, and its scope will be pointed out in the appended claims.

In the drawing, Fig. 1 shows, in a purely diagrammatic manner, a three phase sectionalized bus system of the isolated phase type involving my invention, and Fig. 2 shows a detail of a modification.

While I have chosen to illustrate my invention applied to a system of the isolated phase type in which the phases are widely separated, it is to be understood that it is not limited to a system of the isolated phase type. The drawing therefore is merely illustrative in character and is intended only to show one example of how I may carry out my invention.

Referring now to the drawing, the three main buses A, B and C of a three phase system are shown each divided into three sections 1, 2 and 3, end portions only of sections 1 and 3 appearing. In each bus between sections 1 and 2 are the bus section oil switches 4 and disconnecting switches 5. Similarly in each bus between the sections 2 and 3 are the bus section oil switches 6 and disconnecting switches 7. Connecting with bus section 2, I have shown two feeders 11 and 12, feeder 11 having its phases connected with the main buses through the current transformers 13, oil switches 14 and disconnecting switches 15, and feeder 12 having its phases connected with the main buses through the current transformers 16, oil switches 17 and disconnecting switches 18. Instead of having each feeder circuit connect directly with the main buses as illustrated, they may connect with group feeder buses which in turn connect with the main buses. Moreover, a main bus and an auxiliary main bus may be used for each phase instead of the single main bus illustrated and where group feeder buses also are used, each group feeder bus may selectively be connected to either the main bus or the auxiliary main bus of the corresponding phase.

These arrangements and other well known bus arrangements have not been illustrated, since for the sake of clearness I deem it preferable to show the system in its simplest form.

I have shown the bus section 2 connected to be supplied directly from the generator 20 which it will be noted is Y-connected with its neutral point grounded at 21 through the resistance 22. The generator terminals connect by suitable leads, shown by dotted lines 23 on the drawing, with the respective main buses A, B and C through the oil switches 24 and disconnecting switches 25. Obviously where main and auxiliary buses are used leads and switches would be provided for selectively throwing the generator on either the main or the auxiliary bus.

For operating the various bus section switches, feeder switches and generator switches, I have shown diagrammatically similar operating mechanisms 26, each connected by the bell crank 27 and operating rod 28 with the individual switches of the respective phases. These operating mechanisms may be of any suitable form and will include means by which the switches controlled thereby may be tripped to open circuit position. For illustrative purposes I have shown each operating mechanism 26 provided with a tripping coil 29 which is adapted when energized to cause the switches associated therewith to trip open. I have purposely omitted showing any operating mechanism for the various disconnecting switches as these switches may be operated in any well known manner and to illustrate an operating mechanism therefor would unnecessarily complicate the drawing. The main buses are shown supported by insulators 30.

For each of the three sections, 1, 2 and 3 of the main bus there is a ground bus 31, 32 and 33 respectively, there being a separate bus also for each phase. Each ground bus which should be of relatively large capacity and firmly connected to the station ground is electrically connected with the oil switch frames or bases, the disconnecting switch bases, the current transformer bases, the pins or bases of the bus supporting insulators, the oil switch operating mechanisms and any other normally grounded part of the apparatus associated with the particular bus phase section to which that ground bus belongs. These connections should be made by conductors of suitable size to carry the fault current. For example, ground bus 32 is shown connected with the base of oil switch 14 of feeder 11 by the conductor 34, with the bases of the disconnecting switches of that feeder by conductors 35, with the base of the current transformer 13 of that feeder by the conductor 36, with the operating mechanism 27 of that feeder switch by the conductor 37 and with the pins or bases of the insulators supporting the main bus by the conductors 38.

It is to be understood that by the term bases I refer to all those parts of the respective apparatus which are insulated from the current carrying parts of the apparatus and which usually are grounded. Similar ground bus connections are made with corresponding parts associated with the other feeder circuit and with the generator circuit. The bases of the oil section switches between two adjacent sections are not connected to the ground bus of either section, however, the disconnecting switches may be connected with the respective ground buses of the sections to which these switches connect as illustrated. The three ground buses 32 of section 2 are connected together by the leads 40, 41 and 42 and the junction to ground by the lead 43. In each of leads 40 and 42 is a current transformer 44 whose secondary is connected to the relay 45. Similarly in the ground lead 43 is the current transformer 46 whose secondary is connected to the relay 47. The contacts of relays 45 and 47 are connected in multiple whereby the operation of any one will close the circuit 48 including a source, shown as a battery 49, and the winding of relay 50. The latter relay closes circuits including a source, shown as a battery 51, and the tripping coil 29 of each oil switch operating mechanism whereby the oil switches are tripped open. It is to be understood that when I speak of a ground bus for any apparatus, I mean a ground bus connected to the base, frame or supporting part of the apparatus rather than to the energized part of the apparatus.

With the apparatus described above, should a fault to ground occur in any phase in any section, as for example, at one of the bus supporting insulators or in one of the feeder oil switches, the current in flowing to ground by way of the ground bus of that phase and section will operate one or more of the relays 45, 47 to cause the operation of relay 50 whence the tripping coils of all the oil switches connected to the particular section in which the fault occurred are energized and the switches tripped open. The entire bus section affected is thereby rendered dead and in order that all load carried by that bus section shall not be lost, suitable provision may be made for supplying it also from some other source. The generator will of course be still running and may be arranged to be connected to some other bus section if desired.

It will be noted that the bases of the bus section oil switches 4 and 6 have been shown without any connection with the ground bus system illustrated. This is for the reason that should a fault to ground occur in one of these switches the opening of the switch would probably not relieve either section of the fault. In the event of a fault to ground in a bus section switch the two adjacent sections should be isolated from the rest of the system and for this purpose a separate ground bus should be used having connection with the bases of those bus section switches and having suitable relay connections similar to those described to cause the tripping of all switches controlling and related to the two bus sections joined by the bus section switch affected.

When a pair of bus section switches are used as shown, for example, at 52 and 53 in Fig. 2 instead of a single switch, the bases of these switches may each be connected with the ground bus of the section which it adjoins, such connection being shown at 54. The tripping coils 29 of the operating mechanisms of both switches would be connected to the tripping circuits of both adjacent sections. The two section switches should preferably be separated by a wall 55 having an insulator bushing 56 through which the bus extends. As so connected a fault in either section causes both section switches of the pair to trip open and should the fault occur in either of these switches the other switch will effectively separate the two bus sections and permit the one good section to remain in service.

Although I have illustrated and described my invention as applied to a system in which the source of supply is one or more generators having a grounded neutral, it is also applicable to a system in which the source of supply is not grounded. In such systems the charging currents may be relatively large, depending of course upon the capacitance of the circuits fed therefrom. A fault to ground, for example from a bus bar or in a switch, in any phase provides a path for the charging currents of the other phases which currents immediately increase in value as a result of the fault. The relays in the ground bus circuit will therefore be operated to cause the section affected to be isolated from the rest of the system by the tripping out of the switches associated therewith in the manner already described.

What I claim as new and desire to secure by Letters Patent of the United States is:

1. In combination, polyphase current conducting and controlling apparatus arranged in sections, separate switches controlling current flow to the respective sections, said conducting and controlling apparatus and said switches being provided with ground busses individual to the conducting and controlling apparatus and switches of each section, a source of current connected to supply current to said apparatus, and means connected in said ground busses responsive to the flow of current from apparatus and switches in any section to ground for tripping open the switches controlling current flow to said section independently of the switches and controlling current flow to the other sections.

2. In combination, current conducting and controlling apparatus arranged in sections, feeder circuits extending therefrom, switches controlling said feeder circuits, and means comprising busses connecting the bases of the feeder switches of the respective sections with ground responsive to a fault to ground in a feeder switch of any section for isolating said section from adjacent sections and from the feeder circuits extending therefrom.

3. A protective system for a sectionalized switching system having bus sectionalizing switches whose bases are insulated from the current carrying parts thereof adapted to trip open comprising a separate ground bus connected to the bases of the switches of each section and means responsive to current flow in the ground bus of any section for causing the bus sectionalizing switches at the ends of the section to trip open.

4. A protective system for a polyphase sectionalized switching system having bus bar supports, feeder switches, current transformers and bus selectionalizing switches, comprising a ground bus individual to the bus bar supports, feeder switches and current transformers of each section of each phase, and means comprising relays responsive to current in any ground bus for causing the feeder switches in all phases of that section and the bus sectionalizing switches in all phases at the ends of that section to trip open.

5. In a polyphase switching system of the character described, the combination comprising isolated phase bus bars arranged in sections, section switches and feeder switches connected to said bus bars, said switches having their bases insulated from the current carrying parts thereof, and means for causing the switches connected to any section to trip open upon the occurrence of an insulation breakdown in any one of said switches, said means comprising a ground bus having connections with the bases of the switches of that section.

6. In a polyphase switching system of the character described, the combination comprising isolated phase bus bars arranged in sections, phase section switches connected between and feeder switches connected to the several sections of bus bars, said switch having their bases insulated from the current carrying parts thereof, a separate ground bus bar for each section of each phase connected to the bases of the corresponding phase section and feeder switches, and means responsive to a predetermined current flow to a ground bus of any section for tripping open the corresponding phase section and feeder switches.

7. In combination current conducting and controlling apparatus arranged in sections, two sectionalizing switches connected in series between adjacent sections, a ground bus individual to the apparatus of each section and to the adjacent sectionalizing switch, and means responsive to current flow in the ground bus of any section for tripping open both of said two sectionalizing switches.

8. A protective system for a sectionalized switching system having bus bars, feeder switches and bus section switches, comprising a separate ground bus for each section electrically connected to apparatus associated with said section, and means responsive to current flow in the ground bus of any section for tripping open the feeder switches of that section and the bus section switches at each end thereof.

9. A protective system for a sectionalized switching system having bus bars and generator, feeder and bus section switches associated therewith, comprising a separate ground bus for each bus section, said ground bus electrically connected to the normally grounded portions of the corresponding bus section switches, and to other apparatus associated with that section, and relays responsive to fault current flow in the ground bus of any section adapted to effect tripping simultaneously of said generator, feeder and bus section switches.

10. In a polyphase switching system of the character described, the combination comprising isolated phase bus bars arranged in sections, phase section oil switches connected between the several sections of bus bars, an incoming feeder and a plurality of outgoing feeders connected to each of said bus sections, oil switches for each of said feeders, a separate ground bus bar for each section of each phase, said bus bar electrically connected to the normally grounded portions of the oil switches associated with that section, and relays responsive to fault current flow in a ground bus of any section for effecting tripping simultaneously of the corresponding phase section and feeder switches.

In witness whereof, I have hereunto set my hand this 12th day of February, 1926.

HENRY R. SUMMERHAYES.